G. W. HALL.
Rotary Harrow.
No. 69,340.  Patented Oct. 1, 1867.
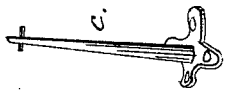
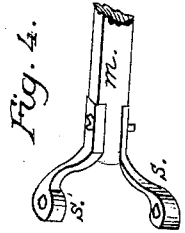
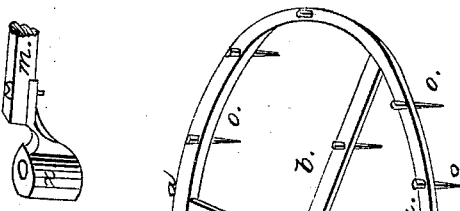
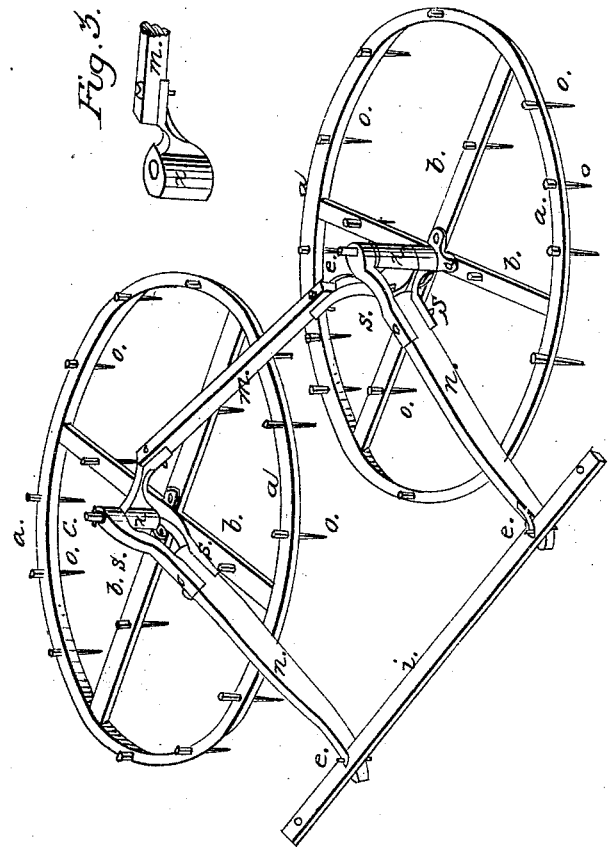
Witnesses:
Silas L. Pickley
B. S. Smith
Inventor:
George W. Hall.

UNITED STATES PATENT OFFICE.

GEORGE W. HALL, OF NEW HAVEN, MICHIGAN.

IMPROVEMENT IN DOUBLE ROTARY HARROWS.

Specification forming part of Letters Patent No. 69,340, dated October 1, 1867.

*To all whom it may concern:*

Be it known that I, GEORGE W. HALL, of New Haven, in Macomb county, State of Michigan, have invented a new and useful Improvement on a Double Rotary Harrow; and I do hereby declare that the following is a full, clear, and exact description of the same, reference being had to the annexed drawings, making a part of this specification, in which—

Figure 1 is a perspective view, and Figs. 2, 3, and 4 views of separate parts of said harrow.

Fig. 1 shows the harrow as it appears when ready for use. $a\,a$ represent a bent rim with but one joint, firmly fastened by joint-irons, and framed onto the ends of the tooth-bars $b\,b$. This rim is set with teeth, thus obviating the necessity of putting teeth at or near the ends of the tooth-bars $b$, which are constantly being split by the teeth when they are too near the ends. The rim is also of great utility when the harrow is used among trees, preventing their getting barked or injured. A less number of teeth are required in the drag by placing them in the rim, and harrow a wider space. $c$, Fig. 2, represents the center-pin, which is made of cast-iron, tapering a little from the base to the apex, and fastened to the frame of the harrow at the center by bolts, as shown. Over the center-pin is slipped the coupling apparatus, consisting of the sleeves $s\,s$ and $x\,x$. The arms of the sleeves $s\,s$ converge to receive the inner ends of the draft-arms $n\,n$. The coupling-bar $m$ is attached, as shown, to the arm of the sleeve $x$, to hold the two harrows the proper distance from each other. The apertures through the sleeves are larger than the center-pin, so as to allow the harrows to accommodate themselves to the inequalities of the ground, and give free play to all the parts. A pin passing through the top of the center-pin holds the sleeves into their places. $i$ represents a cross-bar, resting on the top of the outer ends of the draft-arms $n\,n$, and held in its place by the strap and bolt $e\,e$, to the ends of which are attached the whiffletrees by a clevis, as in the ordinary manner. The object of fastening the bar $i$ in that position is to keep the whiffletrees from falling to the ground when the team is stopped, and that the traces will not so readily unhook. Figs. 3 and 4 show the sleeves $s\,s$ and $x$ detached from the center-pin $c$, and Fig. 2 a view of said center-pin $c$, showing its mode of attachment to the harrow. I am aware of the previous use of a rim similar to $a$, but made of several separate pieces, similar to those used in a wagon-wheel, but not furnished with teeth, as this.

Having thus described my invention, what I claim as new in my invention, and desire to secure by Letters Patent, is—

The combination of the bent rim $a$, having teeth therein, sleeves $s\,s$ and $x\,x$, center-pin $c$, and cross-bar $i$, all constructed and arranged as and for the purposes described.

GEORGE W. HALL.

Witnesses:
 JOHN L. RIPLEY,
 B. P. SMITH.